United States Patent [19]

Franch

[11] 4,282,772
[45] Aug. 11, 1981

[54] ROTATIONAL SPEED AND TORQUE MECHANICAL TRANSDUCER

[76] Inventor: Gino Franch, 54, Via S.Vigilio, Bolzano, Italy

[21] Appl. No.: 53,435

[22] Filed: Jun. 29, 1979

[30] Foreign Application Priority Data

Jul. 14, 1978 [IT] Italy .................................. 4846 A/78
Oct. 30, 1978 [IT] Italy .................................. 4869 A/78
Feb. 23, 1979 [IT] Italy .................................. 4810 A/79

[51] Int. Cl.³ ....................... F16H 29/02; F16H 37/12
[52] U.S. Cl. ........................................ 74/679; 74/118; 74/125.5; 74/812
[58] Field of Search ................. 74/88, 89, 89.1, 89.13, 74/812, 112, 116, 125.5, 126, 679, 318, 322, 323, 324, 70, 52, 84, 117, 118, 810

[56] References Cited

U.S. PATENT DOCUMENTS

| | | | |
|---|---|---|---|
| 2,163,052 | 6/1939 | Niemi | 74/126 |
| 2,345,145 | 3/1944 | Panthoefer | 74/126 |
| 2,493,418 | 1/1950 | Orshansky | 74/125.5 |
| 3,124,964 | 3/1964 | Golding | 74/679 |
| 3,141,345 | 7/1964 | Hartmann et al. | 74/88 X |
| 3,869,929 | 3/1975 | Tosi | 74/112 |

Primary Examiner—Allan D. Herrmann
Attorney, Agent, or Firm—Lowe, King, Price & Becker

[57] ABSTRACT

The rotational speed and torque mechanical transducer comprises:

(a) a epicyclic gearing presenting a sun gear secured on a main shaft, two planet gears and a planet carrier for carrying the said planet gears, rotatably mounted around the axis of the said main shaft;

(b) an active mass connected with each planet gear, whose alternating torques produced by the inertia forces are transmitted to the main shaft, and whose barycenter lies on the axis of rotation of the respective planet gear;

(c) coupling means to couple the driving shaft to the said planet carrier for driving the said carrier into swinging rotational movement around its rotational axis;

(d) at least a pair of freewheel couplings which provide their locking action in opposite rotational directions, limiting the angular speed of the main shaft, and at least one output shaft coupled, through at least one freewheel coupling, with the main shaft.

25 Claims, 18 Drawing Figures

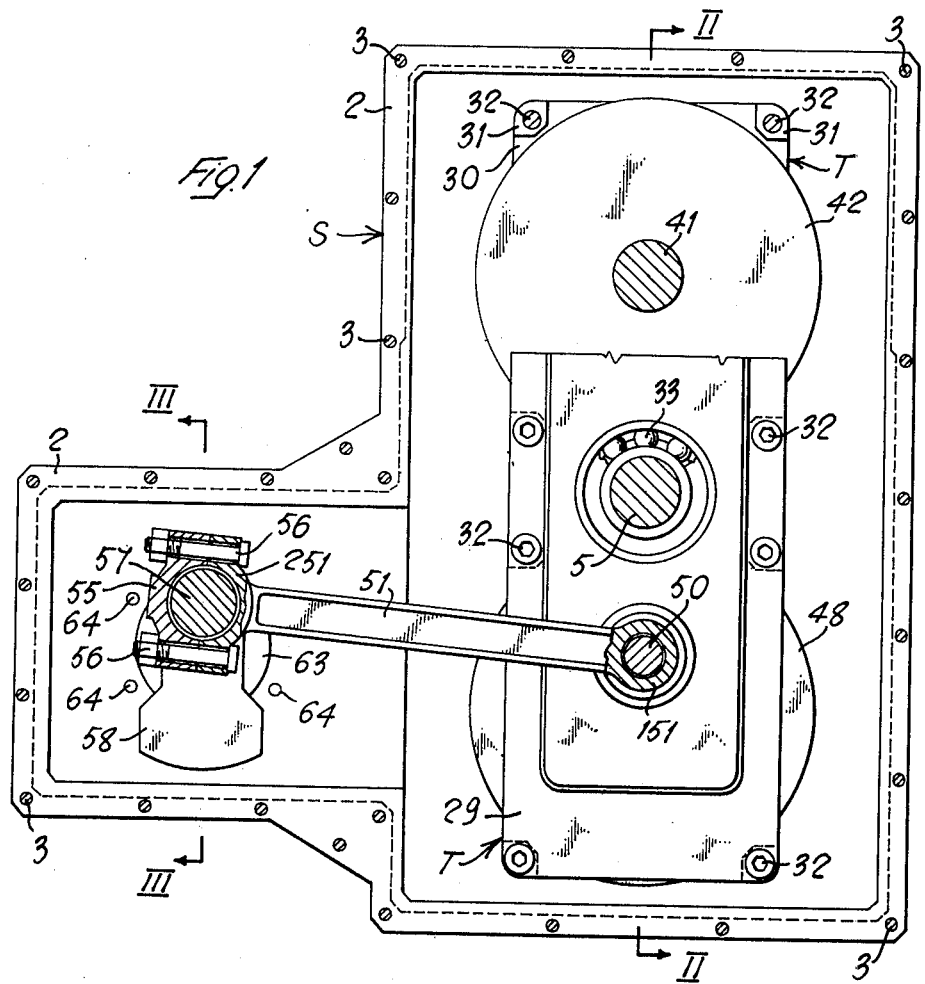
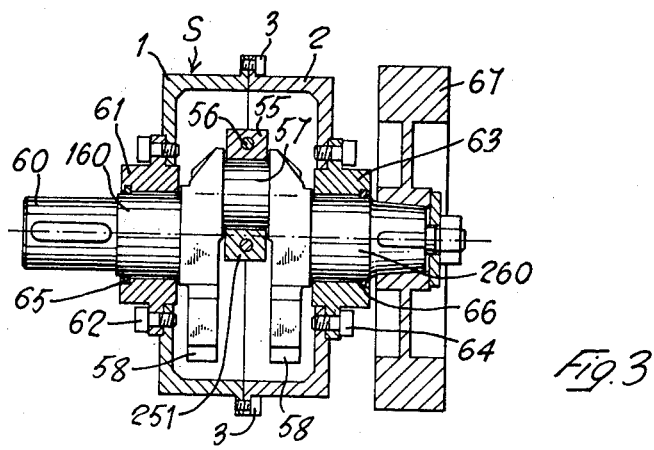

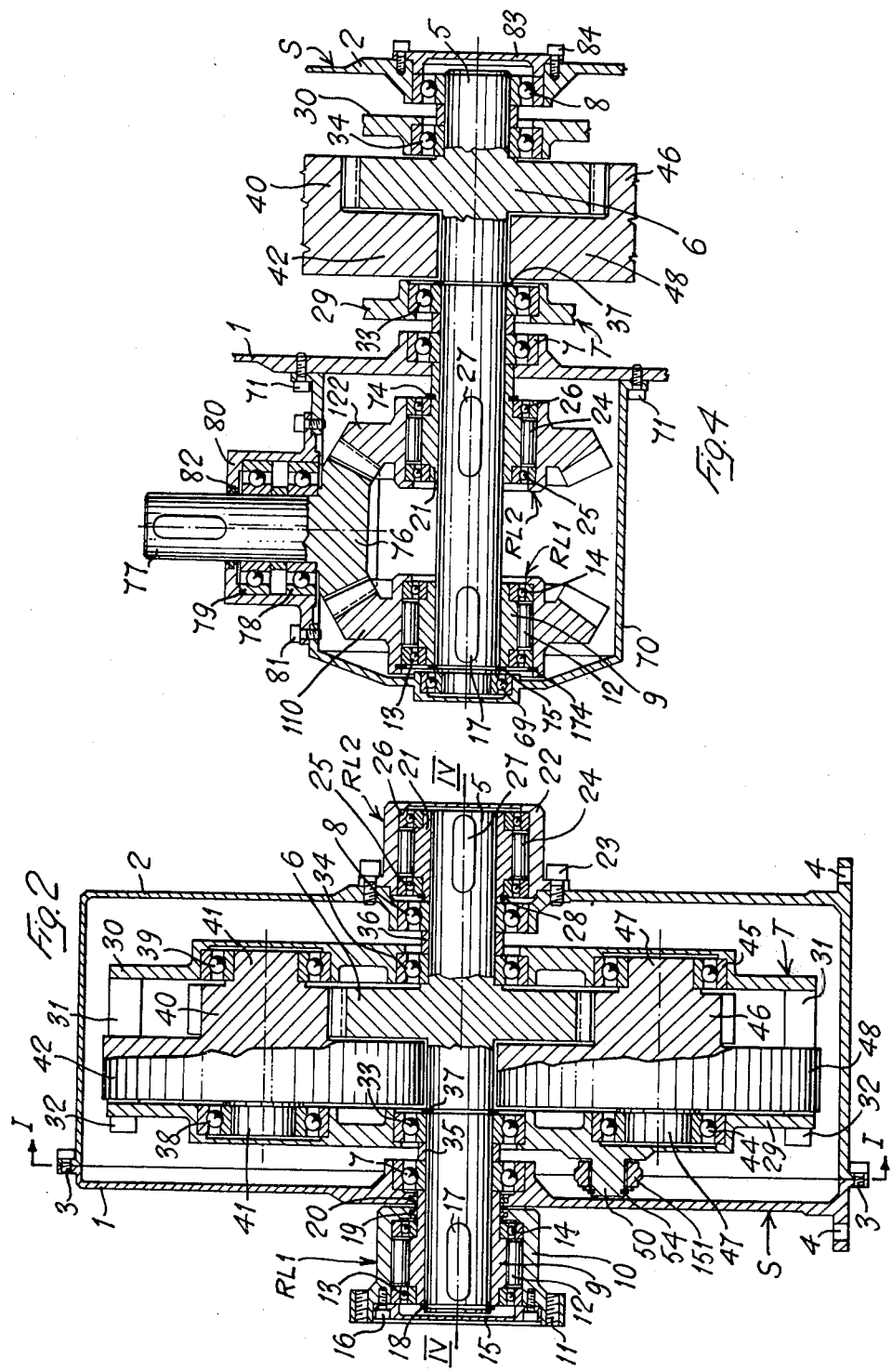

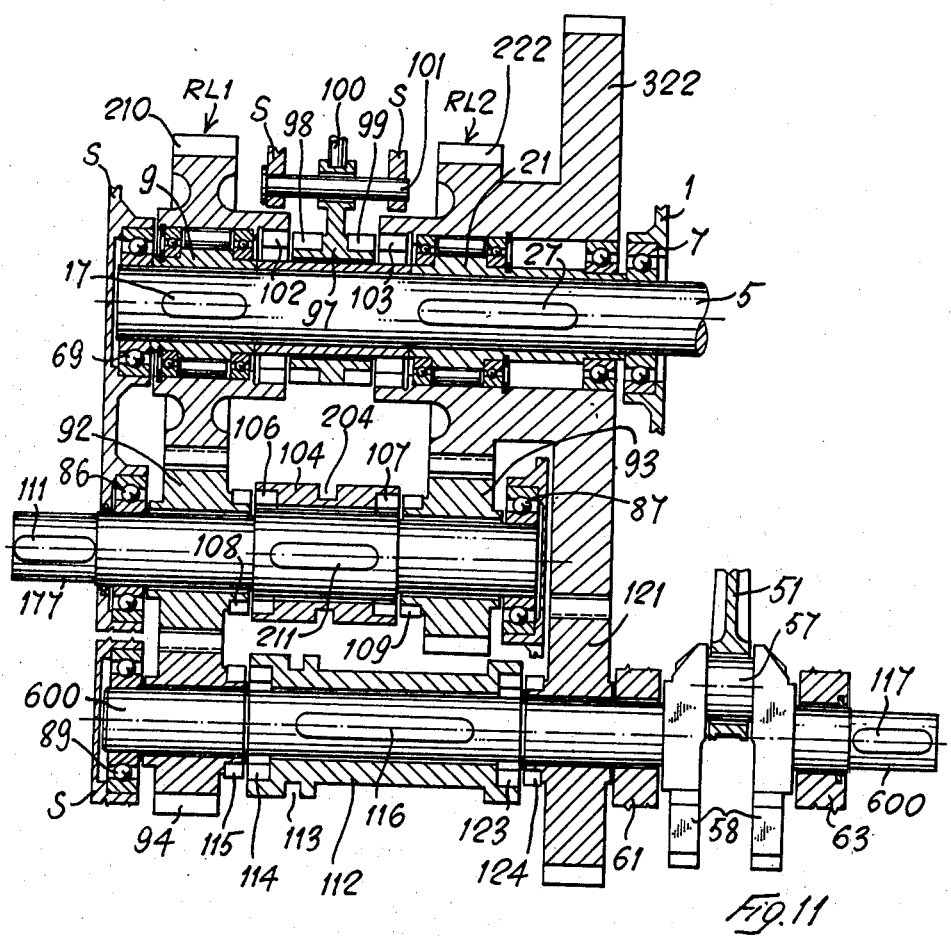
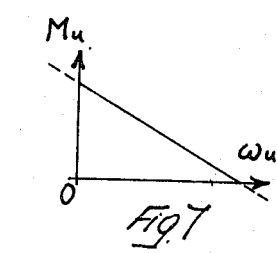
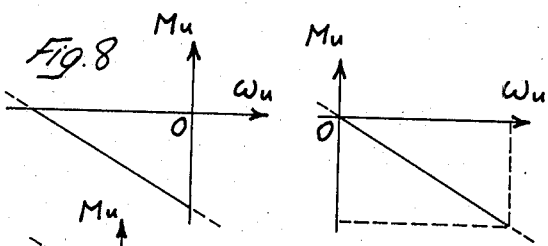
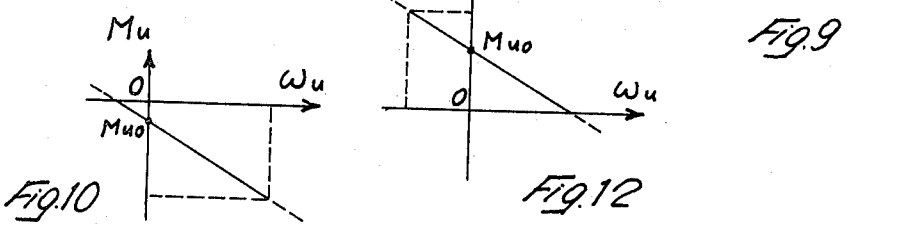

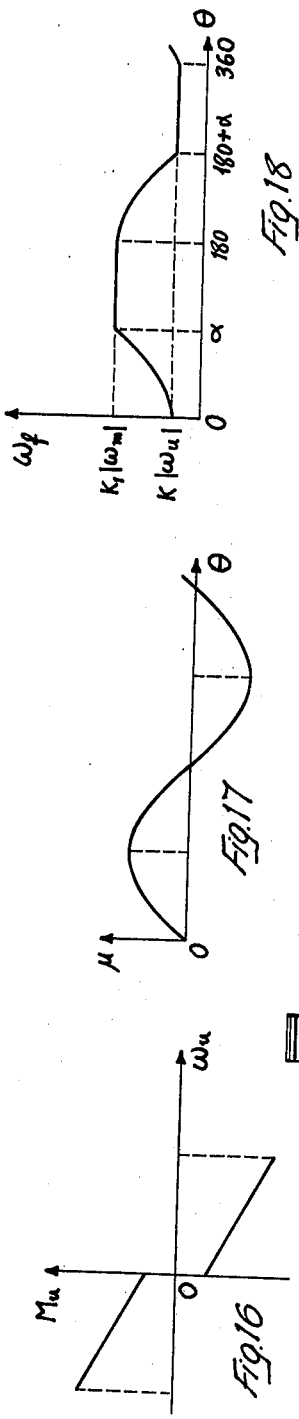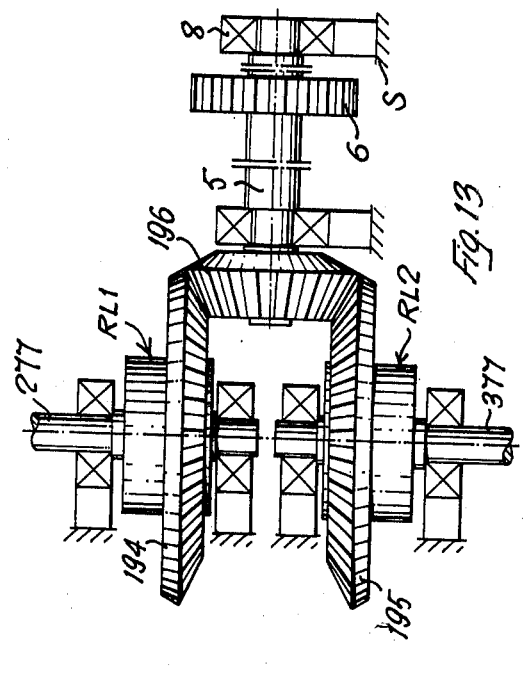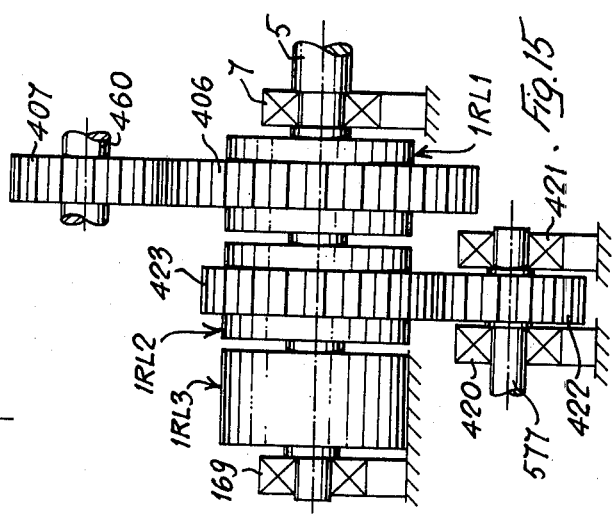

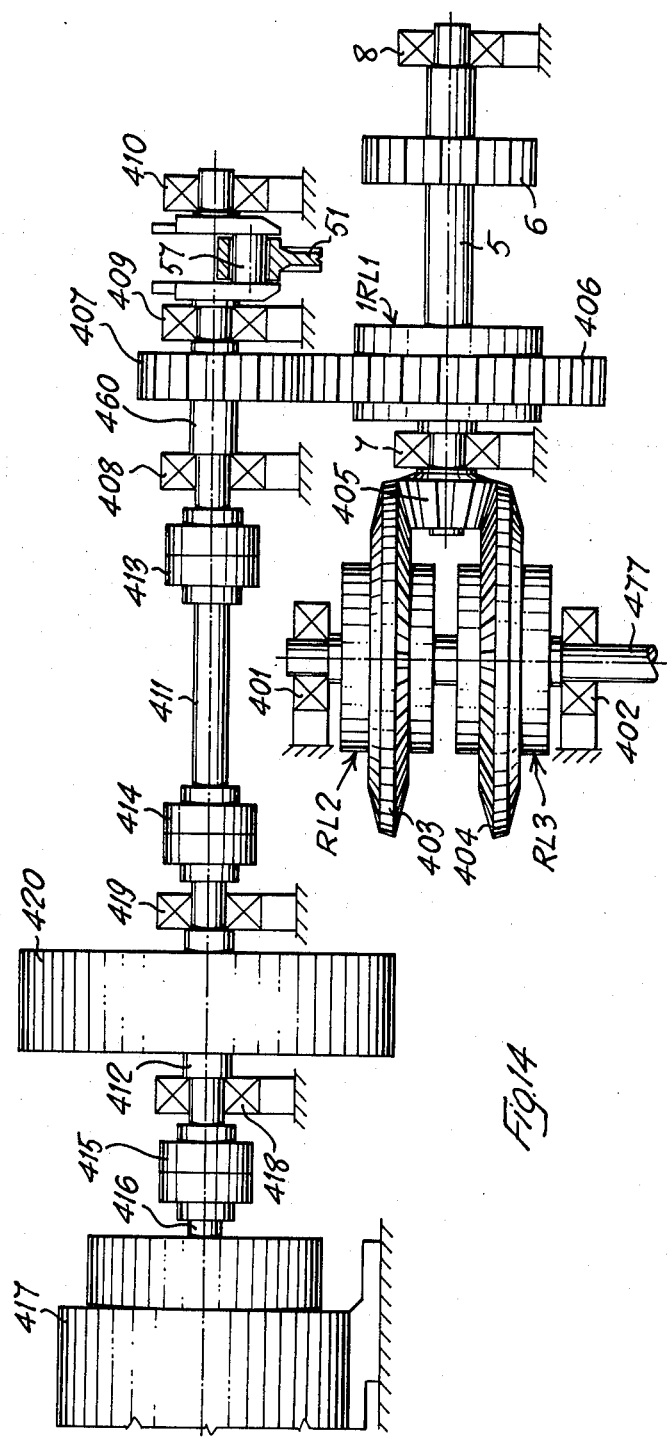

ROTATIONAL SPEED AND TORQUE MECHANICAL TRANSDUCER

SUMMARY OF THE INVENTION

The present invention relates to a rotational speed and torque mechanical transducer.

Object of the invention is to provide a rotational speed and torque mechanical transducer which presents the following advantages with respect to the known transducers:

(1) An improved possibility of control of the transmitted power, due to the characteristic features of the transducer, without the need of employing manual or automatic auxiliary devices;
(2) A high average efficiency of the power transmission, also by strongly changing angular speed of the utilizer connected with the output;
(3) A high acceleration upon starting of the utilizer;
(4) The possibility to change at choice the direction of energy transmission from the driving shaft to the output shaft or viceversa;
(5) The possibility of utilization of fast and scarcely adaptable driving motors.

The above object is attained, according to the invention, by a rotational speed and torque mechanical transducer which is characterized by the following features:

(a) a epicyclic gearing presenting a sun gear secured on on a main shaft, at least one planet gear and a planet carrier for carrying the said planet gears, rotatably mounted around the axis of the said main shaft;
(b) an active mass connected with each planet gear, the barycenter of which mass lies on the axis of rotation of the respective planet gear;
(c) a driving shaft and means for coupling the said driving shaft to the said planet carrier for driving the said planet carrier into swinging rotational movement around its rotational axis;
(d) at least a pair of freewheel couplings which provide their locking action in opposite rotational directions, limiting the movement of the main shaft and at least one output shaft coupled, through at least a freewheel coupling, with the main shaft.

In order to drive the planet carrier into swinging rotational movement, preferably the said carrier is connected with the driving shaft through a crank mechanism.

In the transducer according to the invention, as a consequence of the angular acceleration $\ddot{\psi}$ of the planet carrier with respect to the machine frame, and as a consequence of the angular acceleration $\ddot{\psi}$ of the active masses with respect to the planet carrier, each active mass is subjected to a system of inertia forces which are identical to the reaction forces corresponding to the sum of the accelerations $\ddot{\psi} + \ddot{\psi}$ and which produce, with reference to the rotational axis of the corresponding active mass, a torque having the following formula:

$$\mu = -J(\ddot{\psi} + \ddot{\psi})$$

where J represents the inertia moment of the active mass with respect to the corresponding rotational axis.

For simplicity's sake, it is supposed that the angular acceleration $\ddot{\psi}$ of the planet carrier is expressed by the following formula:

$$\ddot{\psi} = \psi_o \dot{\theta}^2 \sin\theta$$

where $\psi_o$ is the maximum angular displacement of the swingingly driven planet carrier, $\theta$ is the angle of rotation of the driving shaft and $\dot{\theta}$ the angular speed of the driving shaft coupled to motor.

The torques $\mu$ are transmitted to the main shaft, the angular speed $\omega_f$ of which tends to increase in the angular interval $\theta$ (0,180) and to decrease in the angular interval $\theta$ (180,360).

As a consequence of the presence of the two freewheel couplings, the following condition must be always satisfied:

$$\omega_2 \leq \omega_f \leq \omega_1$$

where $\omega_1$ and $\omega_2$ are the angular speeds of both output gears.

Moreover, the condition $$(\omega_1 - \omega_2) \leq \omega_{fM}$$

must be satisfied, where $\omega_{fM}$ is the maximum variation of the angular speed $\omega_f$ of the main shaft, caused by the torques $\mu$. There exists therefore an angle $\alpha$ which is independent from the angular speed $\dot{\theta}$ of the driving shaft, having a value between 0° and 180°, in correspondence of which, during the rotation of the driving shaft, there begins the coincidence of the angular speed $\omega_f$ of the main shaft with the angular speed $\omega_1$ of one output gear. This equation $\omega_f = \omega_1$, indicated as condition of synchronism of one output gear, is maintained for the whole angular interval $\theta$ ($\alpha$, 180). In the said angular interval, the torques $\mu$ of the active masses are transmitted to the said output gear, through the planet gears, the sun gear, the main shaft and the said freewheel coupling. In the angular interval $\theta$ (180+$\alpha$, 360) there is established on the contrary the coincidence of the angular speed $\omega_f$ of the main shaft with the angular speed $\omega_2$ of the other output gear, which is indicated as condition of synchronism of the other output gear, whereby the torques of the active masses are transmitted to the said other output gear.

When the angular speed $\dot{\theta}$ of the driving shaft and the angular speed $\omega_u$ of the output shaft connected with the utilizer remain constant, there result the following four operational phases, which cyclically repeat themselves:

Transition phase $\theta$ (0, $\alpha$) in which the angular speed $\omega_f$ of the main shaft varies from $\omega_2$ to $\omega_1$.

Working phase $\theta$ ($\alpha$, 180) in which the angular speed $\omega_f$ of the main shaft corresponds to the angular speed $\omega_1$ of one output gear, and to the said output gear there are transmitted an average torque $M_1$ and an average power $P_1 = \omega_1 \cdot M_1$, through the corresponding freewheel coupling.

Transition phase $\theta$ (180, 180+$\alpha$) in which the angular speed $\omega_f$ of the main shaft varies from $\omega_1$ to $\omega_2$.

Working phase $\theta$ (180+$\alpha$, 360), in which the angular speed $\omega_f$ of the main shaft is equal to the angular speed $\omega_2$ of the other output gear, and to the said other output gear there are transmitted, through the corresponding freewheel coupling, an average torque $M_2$ and an average power $P_2 = \omega_2 \cdot M_2$.

It is valid the equation $M_1 + M_2 = 0$. The torques $M_1$ and $M_2$ are moreover rapidly increasing together with the ratio between the number of teeth of the sun gear and of the planet gear.

For $\omega_1 - \omega_2 \geq \omega_{fM}$, no torque is transmitted from the main shaft to the output gears.

Each torque $M_1$, $M_2$ tends to increase the difference of the angular speeds $\omega_1 - \omega_2$. Upon increase of this difference, there decreases the amplitude of the working intervals. Consequently, the absolute value of the torques $M_1$ and $M_2$ decreases in a linear manner upon increase of the difference $\omega_1 - \omega_2$ from a maximum value $M_o$, obtained for $\omega_1 - \omega_2 = 0$ to a zero value obtained for $\omega_1 - \omega_2 = \omega_{fM}$. From the above there derives the possibility of self-regulation of the transducer.

The powers $P_1$ and $P_2$ transmitted to the output gears determine the power $P_m$ of the driving shaft, which (if neglectable losses are taken in consideration) must satisfy to the equation $P_1 + P_2 + P_m = 0$. The powers $P_1$ $P_2$ and $P_m$ can assume positive or negative or even zero value, provided that the above equation is satisfied.

The angular speeds $\omega_1$ and $\omega_2$ are limited only by the above mentioned conditions, and therefore they are largely independent. This consents to select particular values of these angular speeds $\omega_1$ and $\omega_2$ so as to obtain the following results:

(A) Transmission of power from the driving shaft to the output shaft with useful torque $M_u$ which decreases from a maximum value to a zero value upon increase of the angular speed $\omega_u$ of the output shaft. The direction of $M_u$ and $\omega_u$ can be inverted (chosen at will) by connecting with the utilizer either one of the output gears. In this manner it is possible to obtain a reversal of the direction of running, without the need of employing intermediate idle gears.

(B) For $\omega_u > 0$ and $\omega_u < 0$ it is possible to effect a transmission of power from the output shaft to the driving shaft (inversion of the direction of energy transmission) with a useful torque $M_u$ which is adjusted in such a manner that the absolute value of the said torque increases continuously from a zero or minimum value to a maximum value upon increase of the angular speed $\omega_u$ of the output shaft. The energy, which corresponds to the power transmitted to the driving shaft, can be utilized in any suitable manner, and particularly it can be stored in flywheels or converted into heat.

(C) Reduction of the value of the torque $M_u$ and of the power $P_u$ which are transmitted to the utilizer, by maintaining constant the rotational speed of the driving shaft and without the occurrence of dissipation.

(D) The torque $M_u$ transmitted to the utilizer is in any case proportional to the square of the angular speed $\dot{\theta}$ of the driving shaft. Consequently there is given the further possibility of a control through relatively small variations of the speed of the driving motor.

The main advantages of the transducer constructed and operating in accordance with the invention are the following:

(1) The power transmitted in both directions, i.e. from the driving shaft to the output shaft as well as viceversa, can be controlled in an extremely exact manner, due to the inherent characteristics of the transducer, without the need of auxiliary manual or automatic devices.

(2) The average efficiency of the transmission is extremely advantageous even in the presence of strongly changing angular speed $\omega_u$ of the output shaft connected with the utilizer, for the following reasons:

(a) As a consequence of the independence of the angular speed $\omega_u$ of the output shaft with respect to the angular speed $\dot{\theta}$ of the driving shaft, the transducer produces, upon variation of $\omega_u$, just a limited variation of the angular speed $\omega_m$ of the driving motor, which may be regulated to a high degree of efficiency. With the devices of the known type, on the contrary, the rotational speed of the driving motor must be strongly varied.

(b) In order to obtain the useful torques, there are not necessary any "dissipative" elements, such as friction clutches or the like hydraulic or electric members. This is valid also for the border case, in which the angular speed $\omega_u$ of the output shaft is equal to zero ($\omega_u = 0$), while on the contrary the angular speed $\dot{\theta}$ of the driving shaft presents a finite value ($\dot{\theta} \neq 0$).

(c) Whenever it is temporarily necessary to reduce the speed of the utilizer, it is possible to transfer the kinetic energy of the utilizer to the flywheel masses of the driving shaft, and subsequently transfer them back to the utilizer, instead of dissipating (i.e. losing) same.

(3) The rotational speed and torque transducer according to the invention affords, as a further advantage, the possibility of a high acceleration upon starting of the utilizer, since in fact at low speeds $\omega_u$ of the output shaft, the braking moment exerted on the shaft of the driving motor is small, and consequently the average torque $M_u$ transmitted to the output shaft can be increased through an increase of the angular speed $\dot{\theta}$ of the driving shaft.

(4) The possibility of controlling in an increasing manner, with the increase of the angular speed $\omega_u$ of the output shaft, the known braking effect exerted on the output shaft (or the utilizer shaft) by an insufficiently fed internal combustion (piston) engine. Moreover the said braking effect can be increased and reduced with $\dot{\theta}^2$, i.e. with the square of the angular speed of the driving shaft.

(5) There can be utilized also fast and scarcely adaptable driving motors ($\dot{\theta} \approx$ constant), even for strongly variating angular speed $\omega_u$ of the output shaft, since the transducer according to the invention requires just minimal variations of the angular speed $\dot{\theta}$ of the driving shaft and permits a direct and strong reduction of the ratios between the average value of the angular speed $\omega_u$ of the output shaft and the angular speed $\dot{\theta}$ of the driving shaft, while the power and the torque, which are transmitted to the utilizer, can be reduced, in case of necessity, even for long time intervals without energy losses and by maintaining constant the speed of the driving motor.

The above and other advantages of the rotational speed and torque mechanical transducer according to the invention will appear evident from the following detailed description of some preferred embodiments of same made by way of non-limiting example with reference to the attached sheets of drawings.

BRIEF DESCRIPTION OF THE DRAWINGS

FIG. 1 is a section through a rotational speed and torque transducer according to the invention, along section line I—I of FIG. 2.

FIG. 2 is a section through the transducer along line II—II of FIG. 1.

FIG. 3 is a section along line III—III of FIG. 1.

FIG. 4 is a section along line IV—IV of FIG. 2, showing a modification of the transducer.

FIG. 7 shows the diagram for $\omega_u > 0$ of the angular speed $\omega_u$ of the output shaft and of the average torque $M_u$ transmitted to the output shaft, in the case of transmission of power from the driving shaft to the output shaft, in the embodiments of FIGS. 2, 4, 5 and 11.

FIG. 8 shows the diagram ($\omega_u$, $M_u$) in the case of a transmission of power, for $\omega_u < 0$ from the driving shaft to the output shaft, in the embodiments of FIGS. 5 and 11.

FIG. 9 shows the diagram ($\omega_u$, $M_u$) in the case of a transmission of power from the output shaft to the driving shaft, in the embodiments of FIGS. 5 and 11.

FIGS. 10 and 12 show particular diagrams ($\omega_u$, $M_u$) in the case of transmission of power, in the embodiments of FIGS. 5 and 11.

FIG. 11 shows a section of another embodiment of the rotational speed and torque transducer according to the invention.

FIG. 13 shows a detail of another embodiment of the transducer according to the invention, in which the main shaft transmits a torque to a pair of independent output shafts.

FIG. 14 shows still another embodiment of the transducer according to the invention, in which the output shaft serves as energy input and can transmit a mechanical power both with negative and positive angular speed.

FIG. 15 is a detail of the embodiment according to FIG. 14, in which the output shaft serving as energy input can transmit energy only at angular speeds presenting a constant sign.

FIG. 16 shows the diagram of the average torque $M_u$ transmitted from the main shaft to the output shaft, depending from the angular speed $\omega_u$ of the output shaft, according to the embodiment of FIG. 14.

FIG. 17 shows the diagram of the instantaneous values of the torque $\mu$ produced by the active mass, depending from the angle of rotation $\theta$ of the driving shaft, in all embodiments.

FIG. 18 shows the diagram of the angular speed $\omega_f$ of the main shaft, depending from the angle of rotation $\theta$ of the driving shaft, in the embodiments of FIGS. 14 and 15.

DESCRIPTION OF THE PREFERRED EMBODIMENT

Figure 5:
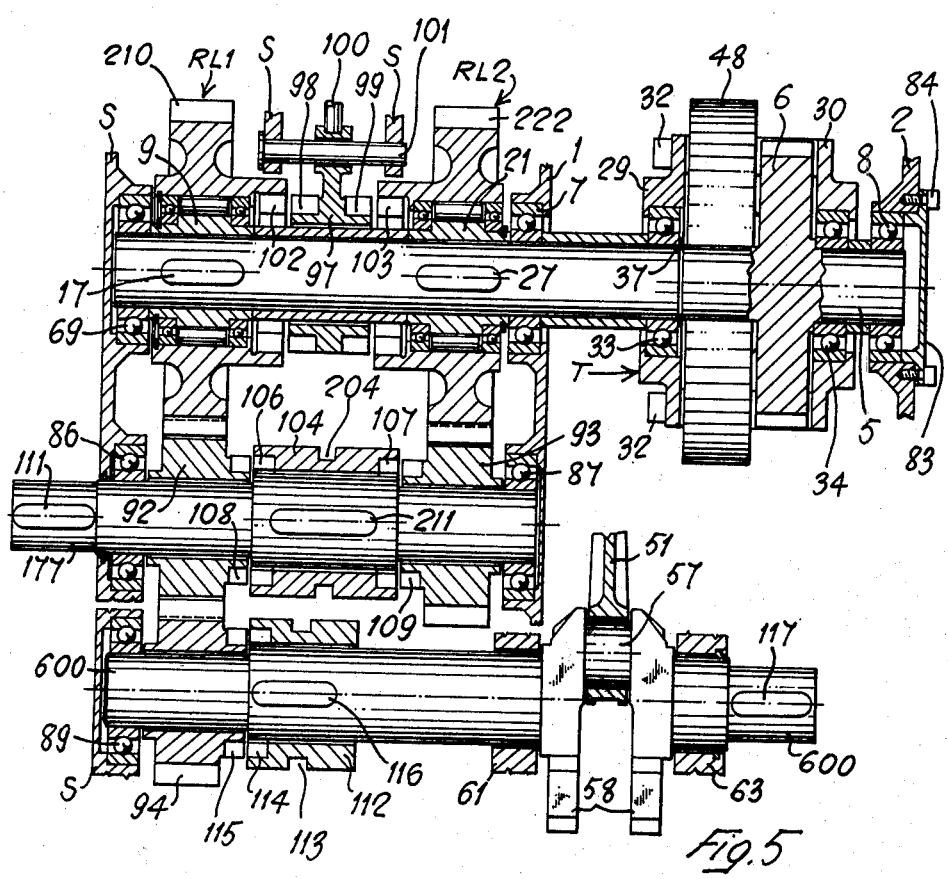
FIG. 5 is a section of another modified embodiment of the transducer according to the invention, along the broken line V—V of FIG. 6.

The rotational speed and torque transducer according to the invention, as illustrated in FIGS. 1 to 3 of the drawings, consists of a housing S which is made of two parts 1 and 2 connected together by means of screws 3, and which is secured to a machine frame (not shown). The said housing is secured to the machine frame by means of screws (not shown) passing through the bores 4 of a flange provided on said housing. At the interior of said housing S, a main shaft 5 is rotatably mounted on bearings 7, 8. Both ends of the main shaft 5, protruding out of the housing S, are connected each by means of a freewheel coupling RL1, RL2 with an output gear 10, respectively 22. The freewheel coupling RL1 consists of an inner ring 9, which is connected to the main shaft 5, integral in rotation therewith, by means of a key 17. The outer ring 10 of the freewheel coupling RL1 is rotatably mounted on the inner ring 9 by means of the bearings 13, 14. Between the inner ring 9 and the outer ring 10 there are arranged the grip rollers 12, which permit a relative rotational movement between the inner ring 9 and the outer ring 10 just in one direction of rotation. The outer ring 10 of the freewheel coupling RL1 represents the corresponding output gear and presents a flange provided with threaded bores 11, by means of which it can be coupled to an output shaft (not shown) or to the utilizer. The cover lid 75, secured by means of screws 16 in correspondence of the head end of the outer ring 10, avoids any axial displacement of the bearing 13. The inner ring 9 of the freewheel coupling RL1 is secured against axial displacement by means of the Seeger ring 18. The packings 19 and 20 avoid the leakage of lubricant material.

The inner ring 21 of the other freewheel coupling RL2 is coupled integral in rotation with the opposed end of main shaft 5 by means of a key 27. The outer ring of this freewheel coupling RL2 represents the corresponding output gear, which, in the embodiment illustrated in FIG. 2, is secured to the housing S by means of screws 23. Between the inner ring 21 and the outer ring 22 there are arranged the bearings 25, 26 and the grip rollers 24. As a consequence of this arrangement, the main shaft 5 can rotate just in one direction with respect to the housing S. The bearing 25 is secured against axial displacement with the aid of the Seeger ring 28.

Both freewheel couplings RL1 and RL2 are designed in such a manner, as to provide for locking action in opposite rotational directions. In this manner, the freewheel coupling RL1 transmits to the output shaft, through the outer ring 10 acting as output gear, the torsional moments (torques) exerted by the main shaft 5 in one rotational direction of same, while the torsional moments exerted in the opposite direction by the main shaft 5, are transmitted through the freewheel coupling RL2 and the corresponding outer ring 22, acting as output gear, to the housing S of the transducer. In case that the sign (sense) of the torque transmitted by the main shaft 5 to the outer ring 10 of the freewheel coupling RL1 is inverted (reversed), then it is necessary a reversal of the locking direction of both freewheel couplings RL1 and RL2.

On the main shaft 5 there is mounted oscillating, on bearings 33, 34, the carrier T of a planetary gearing. The said carrier T of the planetary gearing consists of a pair of carrier plates 29 and 30, which are mounted in spaced relation the one with respect to the other by means of suitable spacing elements 31 and are connected the one to the other by means of screws 32. Between the bearings 33, 34 of the planet carrier T, on one side, and the bearing 7, 8 of the main shaft 5, on the other side, there are arranged spacing rings 35, 36. A Seeger ring 37 avoids any axial displacement of the bearing 33.

Between the carrier plates 29, 30 there are rotatably mounted on diametrally opposite points with respect to the main shaft 5, a pair of planet gears 40, 46. The said planet gears present integrally formed pivot portions 41, respectively 47 and are mounted on the carrier plates by means of bearings 38, 39, respectively 44, 45. Each planet gear 40, 46 is connected with a coaxially arranged cylindrical active mass 42, respectively 48. Preferably, each planet gear 40, respectively 46 is constructed of one piece with the corresponding active means 42, respectively 48. Both planet gears are in meshing contact with a common sun gear 6, which is secured on the main shaft 5, and preferably is obtained of one piece together with the said main shaft. The two active masses 42, 48 are constructed the one identical to the other.

The carrier T of the planetary gearing is coupled through a connecting rod 51 to a driving wheel 60 which is constructed as a crankshaft. More particularly, on the outer side of the carrier plate 29 there is formed a pivot 50 onto which there is inserted the closed head end 151 of the connecting rod 51. A Seeger ring 54 avoids the axial slipping of the head end of the connecting rod from the pivot 50. With its opposite, open head end 251, the said connecting rod 51 encircles the crank pin 57 of the driving shaft 60. The bearing bracket 55 of the open head end 251 of the connecting rod is secured to the said head end by means of screws 56. The crank webs of the driving shaft 60 are provided with counterweights 58. The driving shaft 60 is rotatably mounted with its pivots 160, 260, on bearings 61, 63. The bearings 61, 63 are secured to the housing components 1, 2 by means of screws 62, 64. The crank of the driving shaft 60 is housed at the interior of the housing S and the sealing is guaranteed by means of packings 65, 66 arranged in the zone of the pivots 160, 260. At one end of the driving shaft there is secured a flywheel 67. The opposite end of the driving shaft is connected with a driving motor (not shown), the power of which must be transmitted, controlled through the rotational speed and torque transducer, to a utilizer.

The freewheel couplings RL1, RL2 have been represented as being of the grip-roller type, but of course can be of any other suitable type, adapted to transmit the torque only in one rotational direction.

In the embodiment of the invention illustrated in FIGS. 1 to 3, the output gear 10 is connected to the utilizer, while the other output gear 22 is secured to the fixed housing S. Consequently, the angular spaeed $\omega_1$ of the output gear 10 is equal to the angular speed $\omega_u$ of the not represented output shaft, while the angular speed $\omega_2$ of the output gear 22 is equal to zero. The average power $P_1$ transmitted to the output gear 10 is equal to the average power $P_u$ of the output shaft, while the average power $P_2$ of the output gear 22 is equal to zero. Moreover, the difference $\omega_1-\omega_2$ increases with the increase of $\omega_u$. The average torque $M_u$ transmitted to the output shaft decreases therefore upon increase of $\omega_u$, as shown in FIG. 7.

In the modification shown in FIG. 4, the energy take-off of the transducer according to the invention is different from the one shown in the embodiment of FIGS. 1 to 3. The main shaft 5 presents at one end a prolongation which projects out of the housing S and is rotatably housed on an auxiliary bearing 69 in a gear box 70 secured to one side of said housing by means of screws 71. The bearing 8 at the other end of the main shaft 5 presents a cover lid 83 secured to the housing element 2 by means of screws 84. Both freewheel couplings RL1 and RL2 are secured onto the prolongation of the main shaft 5 at the interior of the gear box 70 at a certain distance the one from the other by means of the respective keys 17, 27. The Seeger rings 74, 174, 75 avoid any axial displacements of the bearings 26, 13 and of the inner ring 9 of the freewheel coupling RL1. The outer rings of the freewheel couplings RL1 and RL2 are constructed as bevel gears 110 respectively 122 meshing with a bevel gear 76 arranged between them and connected to the output shaft 77. The output shaft 77 is rotatably housed in a bearing box 80 by means of bearings 78, 79, said bearing box being fastened to the gear box 70 by means of screws 81. The sealing is obtained by means of an annular packing 82. Both freewheel couplings RL1, RL2 are constructed and arranged in such a manner that they couple the respective output gears 110, 122 with the prolongation of main shaft 5 in opposite rotational directions. The output gears 110 and 122 are equal and are coupled with the same gear transmission ratio with the bevel gear 76. The opposite torques of the main shaft 5 which is driven into rotational oscillations are transmitted by the freewheel couplings 110, 122 to the output shaft 77 in the same rotational direction. The sense of rotation of the output shaft 77 can be inverted only upon inversion of the coupling direction of both freewheel couplings RL1, RL2.

In the modified embodiment according to FIG. 4, the angular speeds $\omega_1$ and $\omega_2$ of both output gears 110 and 122 are equal and oppositely directed, and their absolute value is proportional to the angular speed $\omega_u$ of the output shaft 77. Consequently, the powers $P_1$ and $P_2$ transmitted to the output gears 110 and 122 are equal the one to the other, while the power $P_u$ transmitted to the output shaft 77 corresponds to the sum $P_1+P_2$. Upon increase of the angular speed $\omega_u$ of the output shaft 77, there increases also the difference $\omega_1-\omega_2$. The average torque $M_u$ transmitted to the output shaft 77 therefore decreases upon increase of the angular speed $\omega_u$.

The angle of rotation of the sun gear 6 and of the planet gears 40, 46 around the respective rotational axis presents an average value equal to zero. Therefore the toothing of said gears can be limited to an angle smaller than 360° determined by the ratio of the gear teeth and by the amplitude of the rotary oscillation of the planet carrier T.

Figure 6:
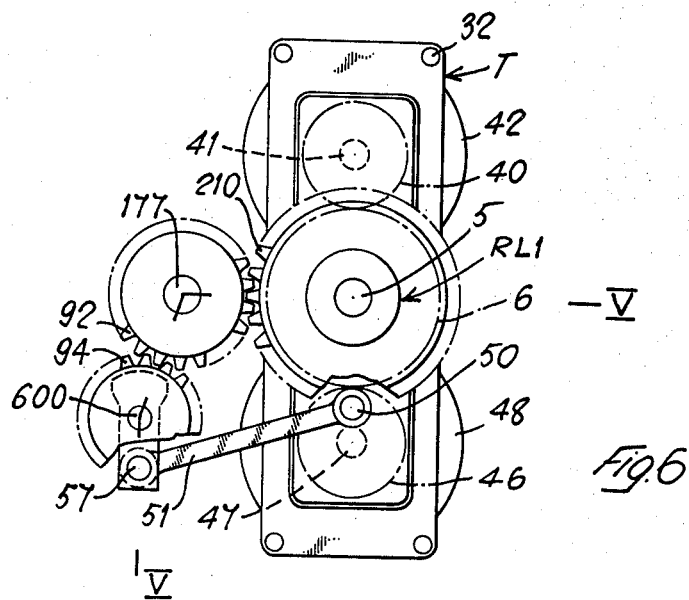
FIG. 6 is a diagrammatic elevation of the embodiment of FIG. 5.

The modified embodiment illustrated in FIGS. 5 and 6 corresponds in part to the embodiment of FIGS. 1 to 3, so that like reference numerals indicate like parts. The outer rings of the freewheel couplings RL1 and RL2 which provide their locking action in opposite direction and are arranged on the prolongation of the main shaft 5 at the interior of housing S, are constructed as spur gears 210, 222 and present on their facing sides an inner or side toothing 102, 103. Between the freewheel couplings RL1, RL2 there is mounted on the prolongation of the main shaft 5, a coupling sleeve 97 arranged freely rotatable and axially slidable, said coupling sleeve 97 being provided with two lateral spur or side toothings 98, 99. The said coupling sleeve 97 is mounted axially slidable by means of a radial arm conducted on a guide rod 101 secured parallel to main shaft 5 at the interior of housing S, and it can be shifted by means of a control shaft 100 or the like. In the right or left shift position of the coupling sleeve 97 the side toothing 99 or 98 of the said sleeve comes into engagement respectively with the inner or side toothing 103 or 102 of the output gear 222 or 210. In this manner, the said output gear 222 or 210 may be connected in non-rotatable manner to the housing S. The coupling sleeve 97 can assume an intermediate position (as shown in FIG. 5) in which the output gears 210 and 222 of both freewheel couplings RL1 and RL2 can rotate freely with respect to the housing S.

Parallel to the main shaft 5 (or to its prolongation) at the interior of housing S there are rotatably mounted the driving shaft 600 and the output shaft 177. The output shaft 177 rotates on bearings 86, 87 and its end projecting out of the housing S is connected with the utilizer (not shown) by means of a key 111. On the output shaft 177 there are mounted freely rotatable a pair of spur gears 92 and 93 which are permanently meshing each with an output gear 210, respectively 222, and which present on their facing sides a side toothing 108, respectively 109. Between the said gears 92, 93 there is mounted on the output shaft 177 a coupling sleeve 104, which is integral in rotation with the said output shaft 177 (for example with the aid of a key 211) but it is axially slidable thereon. The coupling sleeve 104 is provided at both sides with side toothings 106, 107, and can be shifted by means of an outer annular groove 204 and a cooperating control fork (not shown). In a first shift position of the coupling sleeve 104 (shifted to the left in FIG. 5) the side toothing 106 provided on the left side of said coupling sleeve comes into engagement with the side toothing 108 of the gear 92. In this manner, the said gear 92 is coupled integral in rotation with the output shaft 177 through the said coupling sleeve 104. In a second shift position of the coupling sleeve 104 (shifted to the right in FIG. 5) the right side toothing 107 of said sleeve 104 comes into engagement with the side toothing 109 of the other gear 93 and couples the said gear 93 integrally in rotation with the output shaft 177. In the intermediate shift position (represented in FIG. 5) of the coupling sleeve 104, both gears 92 and 93 are disconnected with respect to the output shaft 177.

The end of the driving shaft 600 which projects out of the housing S is connected, by means of a key 117, to a driving motor (not shown). Moreover, the driving shaft 600, formed as a crank shaft, is connected by means of a crank pin 57 and of a connecting rod 51 to the planet carrier T, and drives the said carrier T into oscillatory movement, in the same manner as described in connection with FIGS. 1 to 3. On the driving shaft 600, at the interior of housing S there is mounted a spur gear 94 freely rotatable but not movable in axial direction, which is permanently coupled with the gear 92 of the output shaft 177 and presents a side toothing 115. On the driving shaft 600 there is further mounted a coupling sleeve 112, which is integral in rotation but axially shiftable (for example by means of a key 116) on the driving shaft 600, and which presents a side toothing 114 on its side facing the gear 94. The said coupling sleeve 112 can be shifted by means of an outer annular groove 113 and of a control fork (not shown). Consequently, the coupling sleeve 112 can be shifted at will either to the disconnected position shown in FIG. 5 or to an engagement position (shifted to the left in the said FIG. 5). In the illustrated disconnected position, the coupling sleeve is disconnected from the gear 94, which latter consequently can freely rotate on shaft 600. In the engagement position, the side toothing 114 of the coupling sleeve 112 engages the side toothing 115 of the gear 94 and this latter is rendered integral in rotation with the driving shaft 600.

In the operation of the embodiment shown in FIGS. 5 and 6 there are possible the following operative situations, obtained by shifting of the coupling sleeves 97, 104 and 112:

(a) Controlled transmission of power from the driving shaft 600 to the output shaft 177. The output shaft 177 presents in this case an angular speed $\omega_u > 0$ (forward motion). The said operative situation is obtained by shifting the coupling sleeve 97 on the prolongation of main shaft 5 towards the right in FIG. 5, so that its toothing 99 is brought into engagement with the side toothing 103 of the output gear 222. The said output gear 222 is consequently locked to housing S. At the same time, the coupling sleeve 104 is shifted to the left (FIG. 5) on the output shaft 177, and its side toothing 106 is brought into engagement with the side toothing 108 of gear 92. In this manner, the said gear 92 is coupled to the output shaft 177. The coupling sleeve 112 on the driving shaft 600 remains in the represented disconnected position, i.e. the gear 94 is freely rotatable on the said driving shaft 600. The said operative situation corresponds to the mode of operation of the embodiment illustrated in FIGS. 1 to 3. The only difference resides in the fact that the torque $M_1$ in the embodiment according to FIGS. 1 to 3 is transmitted directly from the output gear of the freewheel coupling RL1 to the utilizer, while in the embodiment illustrated in FIGS. 5 and 6 it is transmitted from the output gear 210 of the freewheel coupling RL1 to the utilizer, through the gear 92 and the output shaft 177. There results therefore also the same diagram of FIG. 7, i.e. the average torque $M_1$ transmitted to the output shaft 177 decreases upon increase of the angular speed $\omega_u$ of the output shaft 177.

(b) Controlled transmission of power from the driving shaft 600 to the output shaft 177. The output shaft 177 presents in this case an angular speed $\omega_u < 0$ (rearward motion). The said operative situation is obtained by shifting the coupling sleeve 97 towards the left (FIG. 5) over the prolongation of the main shaft 5, so that its toothing 98 is brought into engagement with the inner toothing 102 of the output gear 210. Consequently, the said output gear 210 is locked to the housing S. At the same time, the coupling sleeve 104 is shifted towards the right (FIG. 5) along the output shaft 177 and its side toothing 107 is brought into engagement with the side toothing 109 of the gear 93. In this manner, the said gear 93 is locked to the output shaft 177. The coupling sleeve 112 of the driving shaft 600 remains in its disconnected position shown in FIG. 5. In the said operative situation, to which there corresponds the diagram illustrated in FIG. 8 ($M_u$, $\omega_u$) an average torque $M_2$ is transmitted to the output shaft 177, which average torque is directed in opposite direction with respect to the torque $M_1$ transmitted in the operative situation described at a), however it presents the same value, if (as represented) the pairs of gears 210, 92 and 222, 93 present the same multiplication or reduction ratio. The average torque $M_u$ and the angular speed $\omega_u$ of the output shaft present therefore an inverted sign with respect to the operative situation described at (a).

(c) Controlled transmission of power from the output shaft 177 to the driving shaft 600, where the output shaft 177 presents an angular speed $\omega_u > 0$. For this purpose, the coupling sleeve 97 is shifted to its intermediate (FIG. 5) position over the prolongation of the main shaft 5, at which position both output gears 210 and 222 can rotate. At the same time, the coupling sleeve 104 over the output shaft 177 is shifted to the right (FIG. 5) and its side toothing 107 is brought into engagement with the side toothing 109 of the gear 93. Consequently, the gear 93 is coupled integral in rotation with the output gear 177. Finally, the coupling sleeve 112 of the driving shaft 600 is shifted towards the left (FIG. 5) and its side toothing 114 is brought into engagement with the side toothing 115 of gear 94. The said gear 94 as a consequence is coupled integral in rotation with the driving shaft 600. In this operative situation (c) as well as in the below described operative situation (d) the sign of the angular speed $\dot{\theta}$ of the driving shaft 600 is chosen in such a manner that the angular speed $\omega_1$ of the output gear 210 (freewheel coupling RL1) comes to be positive. It results therefrom, that the output gear 210 transmits to the driving shaft 600 an average power $P_1 > 0$ and that the average power $P_u$ transmitted to the output shaft 177 is equal to the average power $P_2$ of the output gear 222 (freewheel coupling RL2), and it is smaller than zero ($P_u = P_2 > 0$). Globally, to the driving shaft 600 there is transmitted the power $-P_u$. Upon increase of the angular speed $\omega_u$ of the output shaft 177, the difference $\omega_1 \omega_2$ of the angular speeds of both output gears 210 and 222 decreases and consequently the absolute value of the average torque $M_u$ of the output shaft 177 increases. If the gear teeth ratio $\gamma_o$ between the gears 94 and 210 is selected in such a manner that the angular speed $\omega_1$ of the output gear 210 is equal to the greatest variation $\omega_{fM}$ of the angular speed $\omega_f$ of the main shaft 5, i.e. $\omega_1 = \omega_{fM}$, then the average torque transmitted to the output shaft 177 is $M_u = 0$, for $\omega_u = 0$. This operative situation is represented in FIG. 9. If on the contrary the gear teeth ratio between the gears 94 and 210 presents a value $\gamma < \gamma_o$, the average torque $M_u$ transmitted to the output shaft 177 assumes a value $M_{uo} < 0$ for an angular speed $\omega_u = 0$ of the output shaft 177. The said operative situation is represented in FIG. 10.

(d) Controlled transmission of power from the driving shaft 600 to the output shaft 177 with reduced average torque $M_u$ of the output shaft 177 and an angular speed $\omega_u < 0$ of the output shaft 177 at constant angular speed $\dot{\theta}$ of the driving shaft 600. In this operative situation, the coupling sleeves 97, 104 and 112 assume the same shifting positions as in the above described operative situation (c). At the same time there is chosen, between the number of teeth of the gears 94 and 210, a ratio $\gamma < \gamma_o$, so that the torque $M_u$ of the output shaft assumes the value $M_u = M_{uo} < 0$ for an angular speed $\omega_u = 0$. Under these conditions the average torque $M_u$ of the output shaft 177 causes the said shaft 177 to assume an angular speed $\omega_u < 0$, while the average power $P_u$ of the output shaft 177 assumes the value $P_u > 0$. The operative situation (d) differs from the operative situation (b) only in that the average torque $M_u$ transmitted to the output shaft 177 and the corresponding power $P_u$ present reduced values. Such a mode of operation can result to be advantageous whenever it is desired to have a smaller torque, but this cannot be obtained by a reduction of the angular speed $\dot{\theta}$ of the driving shaft 600, for example because the driving motor does not permit such a reduction. The diagram torque-angular speed represented in FIG. 10 ($M_u$, $\omega_u$) is valid in the interval $\omega_u > 0$ for the operative situation (c) and in the interval $\omega_u < 0$ for the operative situation (d).

(e) Interruption of the transmission of power through the transducer. The coupling sleeve 104 is brought in its intermediate position represented in FIG. 5. Both gears 92, 93 are therefore disconnected from the output shaft 177. Also the coupling sleeve 112 is brought in its disconnected position represented in FIG. 5. In this manner the gear connection of the output gears 210 and 222 is interrupted both with respect to the output shaft 177 as well as with respect to the driving shaft 600.

The embodiment illustrated in FIG. 11 corresponds substantially to the embodiment of FIGS. 5 and 6, so that like reference numerals indicate like parts. In the modified embodiment according to FIG. 11 the output gear 222 of the freewheel coupling RL2 is connected integral in rotation with an auxiliary gear 322 which is permanently in meshing relation with a gear 121 freely rotatably mounted on driving shaft 600. The coupling sleeve 12, mounted on the driving shaft 600 integral in rotation therewith but axially slidable thereon, presents on its side facing the gear 121 a toothing 123, which can be brought into engagement with a side toothing 124 of the gear 121 by shifting of the coupling sleeve 112.

With the arrangements described in connection with FIG. 5, also in the embodiment shown in FIG. 11 there can be obtained the same above described operative situations from (a) to (e). Additionally, there are also possible the following operative situations:

(f) Controlled transmission of power from the driving shaft 600 to the output shaft 177 under the following conditions: angular speed of the output shaft $\omega_u > 0$; reduced average torque $M_u$ and reduced power $P_u$ of the output shaft; constant angular speed $\dot{\theta}$ of the driving shaft 600.

(g) Controlled transmission of power from the output shaft 177 to the driving shaft 600 at an angular speed $\omega_u < 0$ of the output shaft.

Both operative situations (f) and (g) are obtained by bringing the coupling sleeve 97 to its intermediate position represented in FIG. 11, while the coupling sleeve 104 is shifted towards the left and the coupling sleeve 112 is shifted towards the right. Consequently, both output gears 210, 222 can rotate, while the gear 92 is coupled to the output shaft 177 and the gear 121 is coupled to the driving shaft 600. For both operative situations (f) and (g) the sign of the angular speed $\dot{\theta}$ of the driving shaft 600 is selected in such a manner that the output gear 222 (freewheel coupling RL2) presents a negative angular speed $\omega_2$.

In the operative situation (f) the output shaft 177 has an angular speed $\omega_u > 0$. The output gear 210 (freewheel coupling RL1) transmits to the output shaft 177 a power $P_1 > 0$. The output gear 222 (freewheel coupling RL2) transmits to the driving shaft 600 a power $P_2 > 0$. The average torque $M_u$ and the power $P_u$ of the output shaft 177 are reduced, and more precisely because of the angular speed $\omega_2$ of the output gear 222 which increases the difference $\omega_1 - \omega_2$ between the angular speed $\omega_1$ of the output gear 210 and the angular speed $\omega_2$ of the output gear 222. For $\omega_u = 0$, $M_u$ assumes the particular value $M_{uo}$, which can be adjusted by means of a modification of the gear teeth ratio between the gears 322 and 121, and consequently of the angular speed $\omega_2$ of the output gear 222. The diagram of the angular speed $\omega_u$ and of the average torque $M_u$ of the output shaft 177 can be shifted towards the left or towards the right, since there is introduced a constant angular speed $\omega_1$ respectively $\omega_2$ of the output gear 210 respectively 222. However, the range of operation of the rotational speed and torque transducer is always limited to the interval $\omega_1 - \omega_2 = \omega_{fM}$.

The operative situation (f) is particularly then advantageous whenever the average torque $M_u$ of the output gear 177 must be reduced, but a reduction of the angular speed of the driving shaft 600 is not possible, due to the peculiar characteristics of the driving motor. According to the invention in such a case there is avoided the interposition of a gear reduction unit between the driving motor and the driving shaft 600.

In the operative situation (g) the output shaft 177 has an angular speed $\omega_u < 0$. It derives therefrom that $P_u = P_1 < 0$ and $P_2 > 0$. The output gear 222 transmits the power $P_2$ to the driving shaft 600, to which there is transmitted globally the power $-P_1$ acquired by the utilizer.

FIG. 12 shows the diagram of the angular speed $\omega_u$ and of the average torque $M_u$ of the output shaft 177 for both operative situations (f) and (g). The said diagram is valid for the operative situation (f) in the section $\omega_u \geq 0$ and for the operative situation (g) in the section $\omega_u \leq 0$.

Neither the operative situations from (a) to (d) which can be obtained with the embodiment of FIG. 5, nor the operative situations from (a) to (f) obtainable with the embodiment of FIG. 11 and particularly the operative situations (d) and (f), require a consumption of energy. After the determination of the rotational direction of the driving motor, each one of the above mentioned operative situations can be obtained, also during the transmission, by means of a simple shifting of the coupling sleeves 97, 104, 112.

In FIG. 13 there is diagrammatically shown another embodiment of the rotational speed and torque transducer according to the invention, in which the main shaft 5 transmits the power, through both freewheels RL1 and RL2, alternatingly to the independent output shafts 277 and 377. For this purpose, the main shaft 5 is integral in rotation with a bevel gear 196 which meshes with both bevel gears 194 and 195. The bevel gears 194, 195 are integral in rotation each with the outer ring of a freewheel coupling RL1, respectively RL2. The inner rings of the said freewheel couplings are secured to the output shafts 277 respectively 377. When both freewheel couplings RL1 and RL2 are oriented in the same direction with respect to the common axis of the output shafts 277, 377, the arrangement of FIG. 13 acts in the same manner as an automobile differential, since the shafts 277, 377 are independent the one from the other and the torques transmitted to the said shafts are equal in their sign and in their average value. Each torque is moreover controlled according to the diagram shown in FIG. 7.

In the embodiment shown in FIGS. 14 and 15 of the rotational speed and torque transducer according to the present invention, the shaft (477, 577), up to now indicated as output shaft, will work as energy input shaft. The shaft (460) up to now indicated as driving shaft is connected to the shaft (416) of an alternating current generator, which is connected to an electric distributing network with constant frequency. The power $P_u$ furnished to the said output shaft (477, 577) is successively translated to the main shaft (460) and to the shaft (416) of the alternating current generator and directly transformed into electric power with constant frequency. The transmission of power from the output shaft (477, 577) to the shaft (416) of the alternating current generator is controlled in accordance with diagram of FIG. 16.

The alternating current generator works, by $P_u = 0$ as a synchronous motor in idling condition (no-load) and by $P_u > 0$ as a generator of electric power with constant frequency. The speed of the generator shaft varies with respect to the synchronous speed following to the variations of the torque transmitted to the said shaft from the rotational speed and torque transducer. Consequently a flywheel is connected to the shaft of the generator of alternating current, so as to reduce the amplitude of the said fluctuations of speed of the generator shaft with respect to the synchronous speed.

The most important advantages which are attained with the embodiments shown in FIGS. 14 and 15 can be summarized as follows:

(1) The mechanical energy, which can correspond also to a variable torque, respectively a variable speed, is directly transformed into alternating current electric energy with constant frequency.

(2) Self control (regulation) of the system.

(3) A higher efficiency, since the power losses are limited to the losses resulting from the bearings, the freewheel couplings and the alternating current generator.

More particularly, in FIG. 14 there is shown an embodiment according to which the output shaft of the rotational speed and torque transducer according to the invention can transmit to the driving shaft mechanical power both with positive and with negative angular speed. In FIG. 14 there are illustrated only the main shaft 5, the bearings 7, 8 of the said shaft at the interior of housing S and the sungear 6 secured onto the main shaft 5 of the transducer according to FIGS. 1 to 3. The output shaft 477 rotatably mounted in the bearings 401, 402 is connected integral in rotation with the inner rings (not represented) of two freewheel couplings RL2 and RL3. On the outer rings of the said freewheel couplings RL2 and RL3 there is secured a bevel gear 403, respectively 404. Both bevel gears 403 and 404 are in meshing engagement with an interposed bevel gear 405 which is integral in rotation with the main shaft 5 of the rotational speed and torque transducer. To the main shaft 5 there is also secured the inner ring (not shown) of a freewheel coupling 1RL1, the outer ring of which is secured integral in rotation with the gear 406. The said gear 406 meshes with a gear 407 secured to the driving shaft 460. The driving shaft 460 is mounted, with the aid of bearings 408, 409, 410 at the interior of the housing S of the rotational speed and torque transducer and it is formed, at its right end in FIG. 14, as a crankshaft provided with the crankpin 57 and the connecting rod 51 for swingingly driving the planet carrier T (not shown) of the rotational speed and torque transducer. The other end of the driving shaft 460 (at the left in FIG. 14) is connected, through a pair of co-axial intermediate shafts 411 and 412 and through elastic couplings 413, 414 and 415, with the shaft 416 of an alternating current generator 417. The intermediate shaft 412 rotates on bearings 418, 419, and carries a flywheel 420.

The freewheels RL2 and RL3 exert their locking action in opposite rotational directions. The output shaft 477 can present both negative and positive angular speeds $\omega_u$. The main shaft 5 can assume on the contrary only an angular speed $\omega_f$ in one direction, which is considered as positive. For $\omega_u = 0$, the main shaft 5 cannot transmit any torque to the output shaft 477 due to the presence of both freewheel coupling RL2 and RL3 which are opposedly directed. The locking direction of the freewheel coupling 1RL1 and the rotational direction of the generator shaft 416 are selected in such a manner that there results a positive relative speed of the gear 406 with respect to the main shaft 5. Consequently, the angular speed $\omega_f$ of the main shaft 5 satisfies the following condition:

$$0 \leq K|\omega_u| \leq \omega_f \leq K_1|\omega_m|$$

where K and $K_1$ are the ratios between the number of teeth of the gears 403,405 and 407,406, $|\omega_u|$, $|\omega_m|$ the absolute values of the angular speeds $\omega_u$ of the output shaft 477 and $\omega_m$ of the driving shaft 460. As a consequence of the torques $\mu$ transmitted from the active masses 42, 48 to the main shaft 5, the angular speed $\omega_f$ of the main shaft 5 varies between the limit values $K|\omega_u|$ and $K_1|\omega_m|$, as shown in FIG. 18. Depending upon the angle of rotation $\theta$ of the driving shaft there result consequently both transition phases $\theta$ (0, $\alpha$) and $\theta$ (180, 180 + $\alpha$), in which the angular speed $\omega_f$ of the main shaft 5 varies from $K|\omega_u|$ up to $K_1|\omega_m|$ and backwards, as well as the operational phase $\theta$ ($\alpha$, 180), in which, for $\omega_f = K_1|\omega_m|$, the main shaft 5 transmits power to the driving shaft 460, and the operational phase $\theta$ (180+$\alpha$, 360), in which for $\omega_f = K|\omega_u|$, the output shaft 477 transmits to the main shaft 5 a power $P_u$, and the said power is transmitted to the shaft 416 of the alternating current generator.

The average value $M_u$ of the torque transmitted from the main shaft 5 to the output shaft 477 decreases upon increase of the angular speed $\omega_u$ of the output shaft 477, as illustrated in FIG. 16. The absolute value of the said torque assumes a maximum value for $K|\omega_u|==-K_1|\omega_m|$ and for $\omega_u=0$ it assumes a minimum value which can be adjusted by means of $K_1$.

A practical utilisation of the embodiment according to FIG. 14 is realised in the transformation of the oscillatory motion produced by the sea waves on a floating body, into electric energy. In this case, the vertical displacements of the floating body are transformed into corresponding rotary oscillations of the output shaft 477 of the rotational speed and torque transducer according to the invention, and their power is transmitted to the alternating current generator.

The embodiment illustrated in FIG. 15 differs from the embodiment illustrated in FIG. 14 only in the fact that there is provided another type of connection between the output shaft 577 and the main shaft 5, so that the remaining parts of the device are not illustrated. The output shaft 577 is rotatably mounted on the bearings 420, 421 at the interior of housing S of the rotational speed and torque transducer, and it is integral in rotation with a gear 422, which meshes with a gear 423. The said gear 423 is integral in rotation with the outer ring of a freewheel coupling 1RL2, the inner ring of which is secured to the main shaft 5. Onto the main shaft 5 there are also secured the inner rings of the freewheel couplings 1RL1 and 1RL3. The outer ring of the freewheel coupling 1RL3 is connected in a non-rotatable manner with the housing S of the transducer, for example with a structural member of the machine frame or the like. On the contrary, the gear 406 is connected integral in rotation with the outer ring of the freewheel coupling 1RL1, and meshes with the gear 407 secured onto the driving shaft 460.

The freewheel coupling 1RL3 is constructed in such a manner that it permits only positive rotary oscillations of the main shaft 5. The freewheel coupling 1RL2 is on the contrary constructed is such a manner that the output shaft 577 can transmit to the main shaft 5 only positive torques. For $\omega_u=0$ the main shaft 5 cannot transmit to the output shaft 577 any torque, since it is not allowed to do so by the freewheel coupling 1RL3. The locking direction of the freewheel coupling 1RL1 and the rotational direction of the generator shaft 416 are determined in such a manner that the gear 406 presents a positive relative speed with respect to the main shaft 5. The angular speed $\omega_f$ of the main shaft 5 satisfies consequently similar conditions to those described in connection with the embodiment shown in FIG. 14, whereby however the coefficients $K$ and $K_1$ correspond to the ratios between the teeth numbers of the pair of gears 422,423 and 407,406. For the embodiment shown in FIG. 15 it is valid the diagram ($\theta$, $\omega_f$) shown in FIG. 18. The diagram ($\omega_u$, $M_u$) shown in FIG. 16 is on the contrary valid either only for positive or only for negative values of the angular speed $\omega_u$ of the driving shaft 577.

The embodiment shown in FIG. 15 can be adopted for example in connection with a vertical swinging wall which is arranged capable of swinging around a horizontal rotational axis located above the sea surface in proximity of the beach, vertically with respect to the direction of propagation of the waves. The said swinging wall is caused to swing at each wave impact around and together with its rotational axis and then it falls down again to its vertical position due to its own weight. In this manner, the rotation axis of the swinging wall is caused to effect rotary oscillations, and it entrains into similar movements the output shaft 577. The said shaft 577 transmits the corresponding mechanical power to the driving shaft 460 of the rotational speed and torque transducer, coupled to the alternating current generator, and in this manner it transforms this power into electric energy, with constant frequency.

Other practical utilizations may consist in obtaining electric energy from the rotational movements of a propeller, which can be put into motion by water or wind, and transmits the said rotational movements to the output shaft 577. The frequency of the electric current generator connected to the driving shaft 460 may be constant even in case of variable angular speeds of the propeller.

I claim:

1. A rotational speed and torque mechanical transducer, comprising:
    (a) a epicyclic gearing presenting a sun gear (6) secured on a main shaft (5), at least one planet gear (40, 46) and a planet carrier (T) for carrying the said planet gears, rotatably mounted around the axis of the said main shaft (5);
    (b) an active mass (42, 48) connected with each planet gear (40, 46), whose alternating torques produced by the inertia forces are transmitted to the main shaft (5), and whose barycenter lies on the axis of rotation of the respective planet gear;
    (c) coupling means to couple the driving shaft (60, 460, 600) to the said planet carrier (T) for driving the said carrier (T) into swinging rotational movement around its rotational axis (5);
    (d) at least a pair of freewheel couplings (RL1,RL2, RL3,1RL1,1RL2,1RL3) which provide their locking action in opposite rotational directions, limiting the angular speed of the main shaft (5), and at least one output shaft (77,177,277,377,477,577) coupled, through at least one freewheel coupling, with the main shaft (5).

2. A rotational speed and torque mechanical transducer according to claim 1, in which the torques transmitted to the main shaft in one rotational direction are transmitted to an output shaft and the torques transmitted to the main shaft in the opposite rotational direction are transmitted to another output shaft (377) (FIGS. 2, 5, 11 and 13).

3. A rotational speed and torque mechanical transducer according to claim 1, in which the torques transmitted to the main shaft (5) in both rotational directions, are transmitted to one output shaft (77) according to a single rotational direction of the said shaft (FIG. 4).

4. A rotational speed and torque mechanical transducer according to claim 1, in which the torques transmitted to the main shaft (5) in one rotational direction are transmitted to one output shaft (177) and the torques transmitted to the main shaft (5) in the opposite rotational direction are transmitted to the driving shaft (600), whereby the power transmitted to the driving shaft (600) is always positive, while the power transmitted to the output shaft (177) can be also negative (FIGS. 5, 11).

5. A rotational speed and torque mechanical transducer according to claim 1, in which the torques transmitted to the main shaft (5) in one rotational direction are transmitted to one output shaft (477,577) and the torques transmitted to the main shaft (5) in the opposite rotational direction are transmitted to the driving shaft (460), whereby the power transmitted to the driving shaft (460) is always positive and the power transmitted to the output shaft (477,577) is always negative, and precisely either for rotational movements in both rotational directions of the output shaft (477) or for rotational movements in one single rotational direction of the output shaft (577).

6. A rotational speed and torque mechanical transducer according to any one of the claims 1 to 4, in which coupling means are provided for exchanging at choice the freewheel coupling provided between the main shaft (5) and the output shaft (177), with the freewheel coupling provided between the main shaft (5) and a fixed non-rotatable structural member (housing S), said second freewheel coupling providing its locking action in opposite rotational direction; and which further coupling means are provided for selecting any one operative connection between the main shaft and driving shaft and main shaft and another output shaft.

7. A rotational speed and torque mechanical transducer according to claim 1, comprising a crank drive (50, 51, 57) which connects the driving shaft (60, 600, 460) with the planet carrier (T) for driving said planet carrier into swinging rotational movement.

8. A rotational speed and torque mechanical transducer according to claims 1 or 2, in which the output gear (10) of a freewheel coupling (RL1) is connected with an output shaft and the output gear of the other freewheel coupling (RL2) is locked to a fixed non-rotatable structural member, such as a housing (S).

9. A rotational speed and torque transducer according to claims 1 or 2, in which the output gears (110, 122) of both freewheel couplings (RL1,RL2) are constructed as bevel gears, coaxially arranged and spaced the one from the other, said bevel gears meshing with a common bevel gear (76) arranged between them and connected with an output shaft (77).

10. A rotational speed and torque mechanical transducer according to claim 1, in which the sun gear (6) and the planet gear (40,46) of the epicyclic gearing are toothed along a limited arc section of their circumference.

11. A rotational speed and torque mechanical transducer according to claim 1, in which the output gears (210, 222) of both freewheel couplings (RL1,RL2) are mounted freely rotatable on the main shaft (5) and constructed as spur gears which either can be locked alternately at will to a fixed non-rotatable structural member, being the said output gears in meshing engagement each with a spur gear (92, 93) rotatably mounted on an output shaft (177), the said spur gears (92, 93) being alternately at will connectable integral in rotation with the output shaft (177); the said spur gear (92) mounted on the output shaft (177) being permanently coupled with a spur gear (94) mounted freely rotatable on the driving shaft (600), said last named spur gear (94) being selectively connectable integral in rotation with the driving shaft (600).

12. A rotational speed and torque mechanical transducer according to claim 11, in which the output gear (222) of a freewheel coupling (RL2) is connected integral in rotation with a coaxial spur gear (322) which is permanently meshing with an auxiliary spur gear (121) rotatably mounted on the driving shaft (600), the spur gears (94, 121) mounted on the driving shaft (600) being alternately and selectively connectable with the said driving shaft or being both freely rotatable.

13. A rotational speed and torque mechanical transducer according to claim 11, in which the coaxially arranged and spaced apart output gears (210, 222) of both freewheel couplings (RL1, RL2) are provided with side toothings (102, 103) facing each other, and are connectable alternately at will with an intermediately arranged coupling sleeve (97) which is axially movable and is provided with toothings at both ends, said coupling sleeve being guided in a non-rotatable manner on a fixed structural member.

14. A rotational speed and torque mechanical transducer according to claim 11, in which the axially spaced apart spur gears (92, 93) provided with facing side toothings (108, 109) and mounted on the output shaft, are connectable alternately at will with an intermediately arranged axially movable coupling sleeve (104) which is provided with side toothings (106, 107) at both ends, said coupling sleeve being integral in rotation with the said output shaft (177).

15. A rotational speed and torque mechanical transducer according to claim 11 in which a coupling sleeve (112) is mounted axially slidable on and integral in rotation with the driving shaft (600), wherein both the said coupling sleeve (112) and the said spur gear (94), said spur gear mounted freely rotatable on the driving shaft, include side toothings (115, 114) which face each other, whereby the said spur gear (94) can be brought at will into engagement with the said coupling sleeve.

16. A rotational speed and torque mechanical transducer according to claim 12, in which the axially spaced apart spur gears (94, 121) provided with facing side toothings (115,124), mounted on the driving shaft (600), are connectable alternately at will with an intermediately arranged, axially movable coupling sleeve (112) which is provided with side toothings (114, 123) at both ends, said coupling sleeve being integral in rotation with the said driving shaft.

17. A rotational speed and torque mechanical transducer according to claim 1, in which a bevel gear (196) connected to the main shaft (5) is provided in meshing engagement with a pair of bevel gears (194,195) which are connected, each through a freewheel coupling (RL1, RL2) with a corresponding output shaft (227 resp. 377) (FIG. 13).

18. A rotational speed and torque mechanical transducer according to claim 1, in which the main shaft (5) rotatable in one single direction is connected, through a freewheel coupling (1RL1) and the driving shaft (460), with the shaft (416) of an alternating current generator (417), and with the aid of at least another freewheel coupling with an output shaft (477,577), in such a manner that mechanical power can be transferred from the output shaft (477 resp. 577) to the main shaft (5) and from this latter to the driving shaft (460) (FIGS. 14, 15).

19. A rotational speed and torque mechanical transducer according to claim 18, in which the inner ring of a freewheel coupling (1RL1) is secured to the main shaft (5), the outer ring of the said freewheel coupling being connected integral in rotation with a gear (406)

which is in meshing engagement with a gear (407) secured to the driving shaft (460) (FIGS. 14, 15).

20. A rotational speed and torque mechanical transducer according to claim 18, in which a bevel gear (405) integral in rotation with the main shaft (5) is provided in meshing engagement with a pair of bevel gears (403,404) which are integral in rotation each with the outer ring of a freewheel coupling (RL2,RL3), while the inner ring of the said pair of freewheel couplings are secured to the output shaft (477) (FIG. 14).

21. A rotational speed and torque mechanical transducer according to claim 18, in which the power can be transmitted in both rotational directions of the output shaft (477) to the main shaft (5) which is rotatable in one single rotational direction.

22. A rotational speed and torque mechanical transducer according to claim 18, in which the output shaft (577) transmits the power to the main shaft (5) over a pair of gears (422, 423), one of which is connected integral in rotation with the output shaft (577) and the other with the outer ring of a freewheel coupling (1RL2) presenting its inner ring connected to the main shaft (5) (FIG. 15).

23. A rotational speed and torque mechanical transducer according to claim 18, in which a freewheel coupling (1RL3) presenting the inner ring secured to the main shaft (5) and the outer ring secured in non-rotatable manner with a fixed non-rotatable structural part (housing S), permits the rotation of the main shaft (5) in just one direction (FIG. 15).

24. A rotational speed and torque mechanical transducer according to claim 18, in which a flywheel (420) is provided connected to the shaft (416) of the generator (FIG. 14).

25. A rotational speed and torque mechanical transducer according to claim 1 in which the torques transmitted to the main shaft (5) in one rotational direction are transmitted to an output shaft (177, 277) and the torques transmitted to the main shaft (5) in the opposite rotational direction are transmitted to a fixed non-rotatable structural member (housing S).

* * * * *